Feb. 13, 1923.
W. H. APPLEBY
1,444,898
TILTABLE AND QUICK DETACHABLE STEERING WHEEL
Filed Jan. 10, 1920.
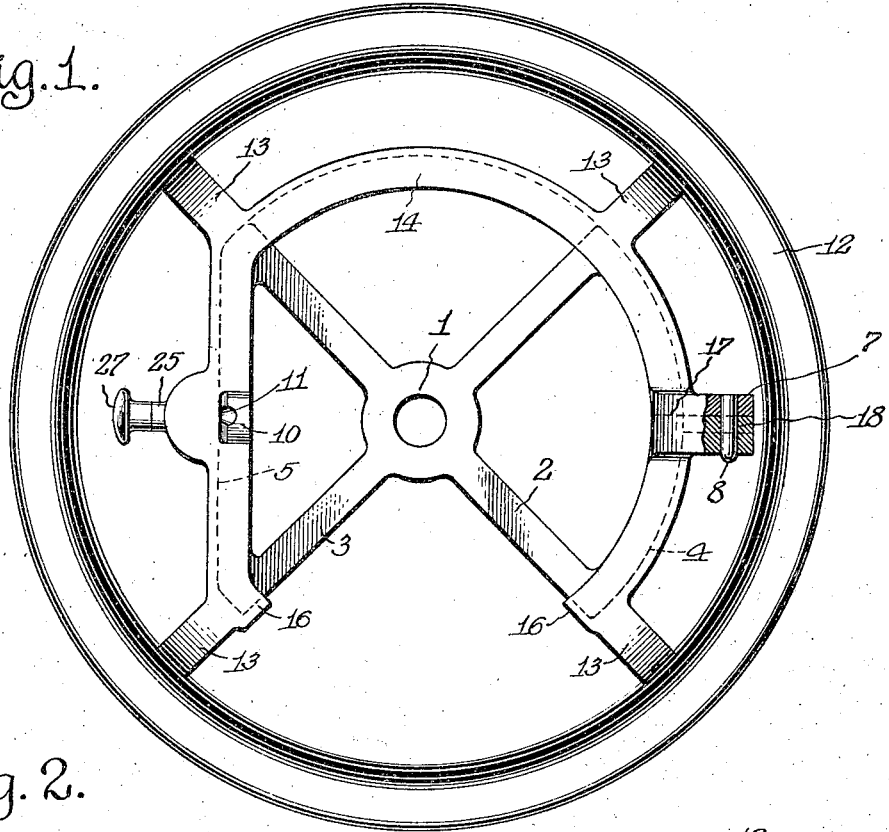
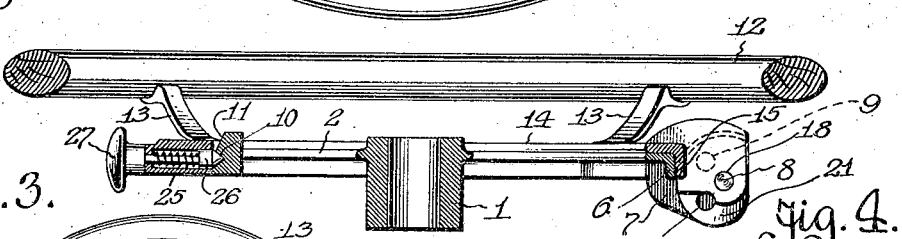
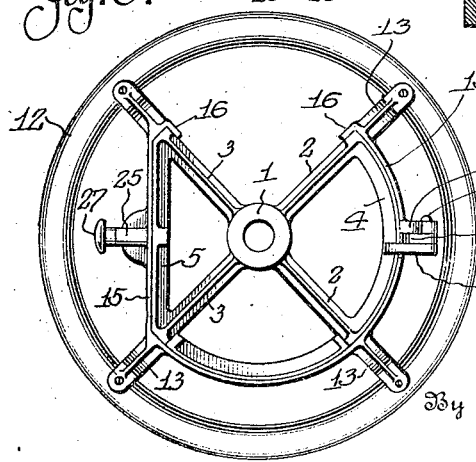
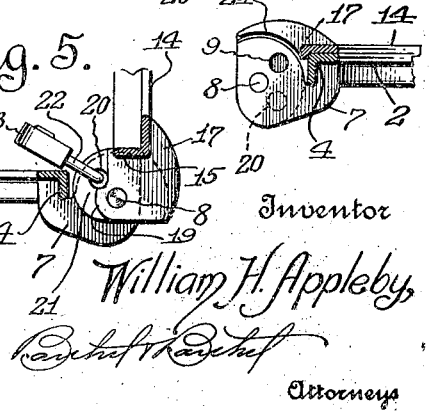
Inventor
William H. Appleby,
By
Attorneys Patented Feb. 13, 1923.

1,444,898

UNITED STATES PATENT OFFICE.

WILLIAM H. APPLEBY, OF SANDWICH, ONTARIO, CANADA.

TILTABLE AND QUICK DETACHABLE STEERING WHEEL.

Application filed January 10, 1920. Serial No. 350,684.

*To all whom it may concern:*

Be it known that I, WILLIAM H. APPLEBY, a subject of the King of Great Britain, residing at Sandwich, in the county of Essex, Province of Ontario, Canada, have invented certain new and useful Improvements in Tiltable and Quick Detachable Steering Wheels, of which the following is a specification, reference being had therein to the accompanying drawings.

My invention aims to provide a tiltable and quick detachable steering wheel or hand gripping member that may be advantageously used in connection with the steering apparatus of an automobile or other motor vehicle, and particularly that type of vehicle liable to be stolen or surreptitiously used, it being one of the objects of my invention to prevent or reduce the theft of automobiles by preventing the automobiles from being steered in the usual manner.

My invention further aims to provide a steering column equipment which will not interfere with the usual quadrants and levers or throttles associated therewith, and the steering column equipment is adapted for holding the tiltable and quick detachable steering wheel so that it may be positively held in an operative or driving relation relative to the steering column equipment, or the wheel tilted so as to provide clearance for movements about the steering column, or the wheel completely removed. Provision is made for locking the steering wheel either in an active position relative to the steering column equipment or in a tilted position, so that while the wheel may be easily detached under ordinary circumstances, yet it cannot be stolen when the wheel is left in an active or inactive position.

My invention further aims to provide a durable and neat appearing steering wheel of a novel construction and this construction will be hereinafter considered and then claimed.

Reference will now be had to the drawings, wherein—

Figure 1 is a top plan of the steering wheel showing it turned a quarter of a revolution in a clock-wise direction from the normal straight ahead position usually occupied by the wheel;

Fig. 2 is a cross sectional view of the steering wheel;

Fig. 3 is a bottom plan of the same on a smaller scale than that shown in Fig. 1, and Figs. 4 and 5 are detail sectional views of the steering wheel illustrating the hinge or pivotal connection thereof.

The steering column equipment of my steering wheel comprises a hub 1 adapted to be fixed on the upper end of the steering shaft of an automobile steering column assembly, and the hub may be fixed so that it cannot be conveniently removed. Formed integral with the hub 1 is an 8 shaped frame comprising members 2 and 3, the former being sector shaped with a segment 4 and the latter triangular shaped or provided with a chord 5. The members 2 and 3 are in opposed relation and are formed with flanges or abutments 6.

The member 2 has its segment 4 provided with a rearwardly extending offset arm or lug 7 having a right angular pin or pintle 8 and an aperture 9.

The chord 5 of the member 3 has a central socket 10 with an inclined or beveled groove 11 communicating therewith, the purpose of which will hereinafter appear.

A tiltable and quick detachable part of the steering wheel comprises a rim 12 supported by the arms 13 of a substantially C shaped spider 14 which has a depending flange 15 and abutments 16 so that the spider may be interlocked or positioned over the members 2 and 3 to establish rotative continuity between said members and the spider 14. The open side of the spider 14 provides clearance for the throttle quadrant associated with a steering column assembly and when the steering wheel is in an active position the quadrant completes or fills in the configuration of the spider 14, imparting an appearance as though the spider formed part of the quadrant. The open side of the spider 14 also permits of the steering wheel being tilted to an inactive position or completely removed relative to the members 2 and 3, and for this purpose the spider has a segment portion thereof provided with a rearwardly extending enlargement 17 provided with an opening 18 to receive the pin 8. By a sidewise movement of the steering wheel, the enlargement 17 can be slipped on to the pin 8 and said enlargement is cut away, as at 19, and apertured, as at 20, so as to provide an apertured ear 21 in parallelism with the arm or lug 7 of the member 2. When the steering wheel is swung to a tilted or inactive position the aperture 20 of the ear 21 is adapted to register with the aperture 9 of the arm or lug 7 and permit of the shackle 22 of a lock 23 being employed for locking the steering wheel relative to the steering column. With the lock 23 in position, it is impossible for the steering wheel to be stolen or swung to an active position, and with the steering wheel swung to the rear side of the steering column it is practically impossible to use the steering wheel for steering purposes.

The enlargement 17 of the spider 14 also provides a stop shoulder 24 to limit the tilting movement of the steering wheel to an inactive position, thus defining the tilted position of the steering wheel so that the apertures 9 and 20 will register to receive the lock shackle 22.

At the front side of the spider 14 is a barrel 25 provided with a spring pressed detent 26 having a handle or knob 27. The detent 26 is adapted to engage in the socket 10 when the steering wheel is swung downwardly into engagement with the members 2 and 3 to assume an active position, and as the detent encounters the groove 11, said detent is forced to a retracted position until it can enter the socket 10 and lock the spider 14 relative to the member 3. The knob 27 is in proximity to the front side of the wheel rim 12 and can be easily gripped when it is desired to retract the detent 26 and elevate the steering wheel.

I am aware that steering wheels have been connected to steering columns by attaching means designed for constantly retaining the steering wheel at the column, but such attaching means does not permit of ready and quick detachment of the wheel for my purposes. I therefore attach considerable importance to the manner of articulating the wheel spider with the steering column 3, and while in the drawing there has been illustrated a preferred embodiment of my invention, it is to be understood that the structural elements are susceptible to such variations and modifications as fall within the scope of the appended claims.

What I claim is:—

1. The combination of a steering frame, a quick detachable steering wheel carried thereby, and an ear and pin connection between said frame and wheel permitting of said wheel being tilted and when so tilted laterally removed from the pin.

2. The combination set forth in claim 1, wherein the steering frame has a lug supporting the pin and said lug adapted to register with the ear of said wheel and permit of said ear and lug receiving the shackle of a lock.

3. The combination of a steering hub having members adapted to provide clearance for the quadrant of a steering column, and a steering wheel having a spider adapted to establish driving relation with the members of said hub, said wheel spider having an open side providing clearance for the quadrant of the steering column so that the quadrant may complete the appearance of the spider.

In testimony whereof I affix my signature in the presence of two witnesses.

WILLIAM H. APPLEBY.

Witnesses:
KARL H. BUTLER,
ANNA M. DORR.